US011692532B2

(12) United States Patent
Buckley et al.

(10) Patent No.: US 11,692,532 B2
(45) Date of Patent: *Jul. 4, 2023

(54) ELECTRIC DRIVE PUMP FOR WELL STIMULATION

(71) Applicant: ST9 Gas and Oil, LLC, The Woodlands, TX (US)

(72) Inventors: Christopher Paul Buckley, Montgomery, TX (US); Brian Boguski, Milford, OH (US)

(73) Assignee: ST9 Gas and Oil, LLC, Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,305

(22) Filed: Jul. 27, 2022

(65) Prior Publication Data
US 2022/0356871 A1     Nov. 10, 2022

Related U.S. Application Data

(60) Continuation of application No. 17/657,483, filed on Mar. 31, 2022, now Pat. No. 11,408,404, which is a
(Continued)

(51) Int. Cl.
*F04B 17/03*       (2006.01)
*F04B 15/02*       (2006.01)
(Continued)

(52) U.S. Cl.
CPC .............. *F04B 17/03* (2013.01); *E21B 43/26* (2013.01); *E21B 43/2607* (2020.05); *F04B 9/02* (2013.01);
(Continued)

(58) Field of Classification Search
CPC ........ E21B 43/26; E21B 43/2607; F04B 9/02; F04B 15/02; F04B 17/03; F04B 53/006;
(Continued)

(56) References Cited

U.S. PATENT DOCUMENTS 8,083,504 B2 * 12/2011 Williams ................ F04B 15/02
417/523
10,598,258 B2 * 3/2020 Oehring .................. E21B 43/26
(Continued)

FOREIGN PATENT DOCUMENTS

| CN | 109882144 A | 6/2019 |
| WO | WO 2019060922 A1 | 3/2019 |
| WO | WO 2019204323 A1 | 10/2019 |

OTHER PUBLICATIONS

United States Patent and Trademark Office, International Search Report and Written Opinion, PCT/US2020/053499, dated Feb. 5, 2021, 14 pages, United States of America.

*Primary Examiner* — Peter J Bertheaud
(74) *Attorney, Agent, or Firm* — Haynes and Boone, LLP (57) ABSTRACT

An electric drive hydraulic fracturing pump system includes one or more electric motors, with each electric motor electrically coupled to a dedicated dual inverter to control operation of the motor. A plurality of electric motors may be coupled to each end of a pump crankshaft and configured to provide rotational power to the power end of a hydraulic fracturing pump through a planetary gearset coupled to each end of the crankshaft. A hydraulic cooling circuit having a first and second cooling systems may be used to regulate the temperature of the electric motors and dual inverters.

18 Claims, 9 Drawing Sheets

Related U.S. Application Data division of application No. 16/683,057, filed on Nov. 13, 2019, now Pat. No. 11,313,359.

(60) Provisional application No. 62/909,082, filed on Oct. 1, 2019.

(51) Int. Cl.

| | |
|---|---|
| *F04B 53/08* | (2006.01) |
| *H02K 9/19* | (2006.01) |
| *F16H 1/28* | (2006.01) |
| *H02K 11/33* | (2016.01) |
| *H02K 7/116* | (2006.01) |
| *E21B 43/26* | (2006.01) |
| *F04B 9/02* | (2006.01) |
| *F04B 47/02* | (2006.01) |
| *F04B 49/06* | (2006.01) |
| *F04B 53/00* | (2006.01) |

(52) U.S. Cl.
CPC .............. *F04B 15/02* (2013.01); *F04B 47/02* (2013.01); *F04B 49/06* (2013.01); *F04B 49/065* (2013.01); *F04B 53/006* (2013.01); *F04B 53/08* (2013.01); *F16H 1/28* (2013.01); *H02K 7/116* (2013.01); *H02K 9/19* (2013.01); *H02K 11/33* (2016.01)

(58) Field of Classification Search
CPC ........ F04B 49/06; F04B 49/065; F04B 47/02; H02K 11/33
See application file for complete search history.

(56) References Cited

U.S. PATENT DOCUMENTS

| | | | |
|---|---|---|---|
| 11,168,681 B2 * | 11/2021 | Boguski | F04B 53/006 |
| 11,313,359 B2 * | 4/2022 | Buckley | H02K 9/19 |
| 11,339,769 B2 * | 5/2022 | Buckley | F04B 17/03 |
| 2004/0219040 A1 * | 11/2004 | Kugelev | F04B 17/03 417/415 |
| 2007/0041849 A1 * | 2/2007 | Allen | F04B 49/126 417/273 |
| 2019/0169971 A1 | 6/2019 | Oehring et al. | |

\* cited by examiner

ELECTRIC DRIVE PUMP FOR WELL STIMULATION

PRIORITY

The present application is a Continuation of U.S. application Ser. No. 17/657,483, filed Mar. 31, 2022 (now U.S. Pat. No. 11,408,404), which is a Divisional of U.S. application Ser. No. 16/683,057, filed Nov. 13, 2019 (now U.S. Pat. No. 11,313,359), which claims priority to U.S. Provisional Application No. 62/909,082, filed Oct. 1, 2019, the benefit of which is claimed and the disclosures of which are incorporated herein by reference in their entirety.

TECHNICAL FIELD

The present application relates generally to hydraulic fracturing in oil and gas wells, and in particular to an electric drive pump used to drive a fluid end for the pumping of a fracturing fluid into a well.

BACKGROUND

It is difficult to economically produce hydrocarbons from low permeability reservoir rocks. Oil and gas production rates are often boosted by hydraulic fracturing, a technique that increases rock permeability by opening channels through which hydrocarbons can flow to recovery wells. Hydraulic fracturing has been used for decades to stimulate production from conventional oil and gas wells. The practice consists of pumping fluid into a wellbore at high pressure (sometimes as high as 50,000 PSI). Inside the wellbore, large quantities of proppants are carried in suspension by the fracture fluid into the fractures. When the fluid enters the formation, it fractures, or creates fissures, in the formation. Water, as well as other fluids, and some solid proppants, are then pumped into the fissures to stimulate the release of oil and gas from the formation. When the pressure is released, the fractures partially close on the proppants, leaving channels for oil and gas to flow.

Fracturing rock in a formation requires that the fracture fluid be pumped into the well bore at very high pressure. This pumping is typically performed by high pressure, hydraulic fracturing pumps, with a diesel engine used to power operation of the pump to deliver fracture fluids at sufficiently high rates and pressures to complete a hydraulic fracturing procedure or "frac job." While such hydraulic fracturing pumps are able to pump fracturing fluid into a well bore at a high enough pressure to crack the formation, they also have drawbacks. For example, the diesel powered pump systems are very heavy, and thus must be moved on heavy duty trailers, making transport of the pump systems between oilfield sites expensive and inefficient. In addition, the diesel engines required to drive such pumps require a relatively high level of expensive maintenance. Furthermore, the cost of diesel fuel is much higher than in the past, meaning that the cost of running the pump systems has increased.

To avoid the disadvantages of diesel-powered hydraulic fracturing pump systems, electrically powered hydraulic fracturing pump systems have been proposed. Some prior art systems offer a dual electric motor configuration coupled to one or two triplex pumps. This large, industrial-sized, and air-cooled hydraulic fracturing pump system can be capable of 3600-4500 hydraulic horsepower (HHP). Other prior art systems employ a single electric motor configuration, wherein a centrally located motor is connected by two quintuplex pumps via a through-spindle design. This larger prior art hydraulic fracturing pump system is also air-cooled, and is capable of 6000 HHP. Existing prior art electric configurations experience inefficiencies in certain key areas. Contemporary offerings for electric frac configurations are composed of existing components from mechanical systems that are repurposed for electric applications. These components were not specifically built for electric systems. Consequently, effective horsepower is decreased due to design conflicts introducing hydraulic and mechanical resistance, as well as accelerated wear cycles as a result of violent harmonics and misalignments in provisional electric systems.

Additionally, the inefficiencies stem from the fact that air-cooling solutions often are not capable of regulating the temperatures of these large electric motor systems, especially in environments where heat is a special concern. This leads to motors running hotter, and therefore, far less efficiently, which reduces the effective hydraulic horsepower of the entire hydraulic fracturing pump system. The inability to regulate running temperatures can also lead to premature failure.

There are other concerns regarding the integration of existing mechanical components and electric motors, such as the optimization of the ratios used by power end reduction gears. Electric motors are often mistakenly considered to produce the same results at any RPM. Even though they have flatter and more consistent torque and power curves than internal combustion solutions, this is not entirely true. Electric motors do perform best within a certain RPM range, and contemporary offerings have not taken full advantage of the optimization that understanding provides. Reduction gear ratios that were not chosen for use in a specific electrical application expose motors that drive them to possible premature failure, whether it be from spinning outside of the optimal range or introducing harmonic imbalances and damaging the powertrain as a whole.

Although great strides have been made with respect to the power end of a fracturing pump system, there clearly is room left for improvement in electric drive pump fracking systems.

BRIEF DESCRIPTION OF THE DRAWINGS

For a more complete understanding of the present disclosure and its features and advantages, reference is now made to the following description, taken in conjunction with the accompanying drawings, in which:

FIG. 1B is a schematic illustration of the overall architecture of the electric hydraulic fracturing pump system of FIG. 1a;

FIG. 5h is an alternative perspective view of the electric hydraulic fracturing pump system of FIG. 5a;

FIG. 6c is an alternative perspective view of the electric hydraulic fracturing pump system of FIG. 6a.

DETAILED DESCRIPTION

It is an object of the present application to provide an electric drive hydraulic fracturing pump system for use in well stimulation. The electric drive hydraulic fracturing pump system is configured to provide a plurality of individual electric drive motors and individual dual inverters, each electrically coupled to and controlling a separate electric drive motor, in selective configurations that work together to provide power to a power end. Each electric drive motor is controlled by its own dual inverter. The electric drive motors are coupled to a gearbox assembly to provide rotational power to a pump crankshaft around which the electric drive motors are radially spaced. Each dual inverter is utilized to convert or rectify an AC power signal from a power source such as a generator into a DC power signal and thereafter, applies pulse width modulation to the DC power signal to produce an AC output voltage and frequency in order to control flow and torque of its associated electric drive motor. The electric drive hydraulic fracturing pump system includes a transmission assembly that is composed of the gearbox and the plurality of electric motors. The transmission assembly is attachable to any power end and is operable with legacy power ends.

Because of the amount of heat generated by the dual inverters, as well as the electric drive motors, a cooling circuit having parallel dual cooling systems, with one cooling system regulating temperature of the electric drive motors and the other cooling system regulating temperature of the dual inverters.

The electric drive hydraulic fracturing pump system in accordance with the present application overcomes one or more problems commonly associated with conventional pumps used to stimulate a well. The electric drive hydraulic fracturing pump system of the present application is configured to incorporate a plurality of electric drive motors to the power end or pump portion of an electric drive hydraulic fracturing pump system and a corresponding number of dual inverters, where each dual inverter controls a separate electric drive motor. The electric drive motors are configured to operate either collectively or independently to vary the power supplied to the power end. The electric drive motors may operate in any combined manner and may operate in any sequential order. The individual dual inverters control torque of their related electric drive motors to individually regulate power output of each electric drive motor. By including smaller electric drive motors, the electric drive motors are more easily obtained in the market, precise power requirements may be met smoothly, and overall power consumption may be minimized.

Figure 1A:
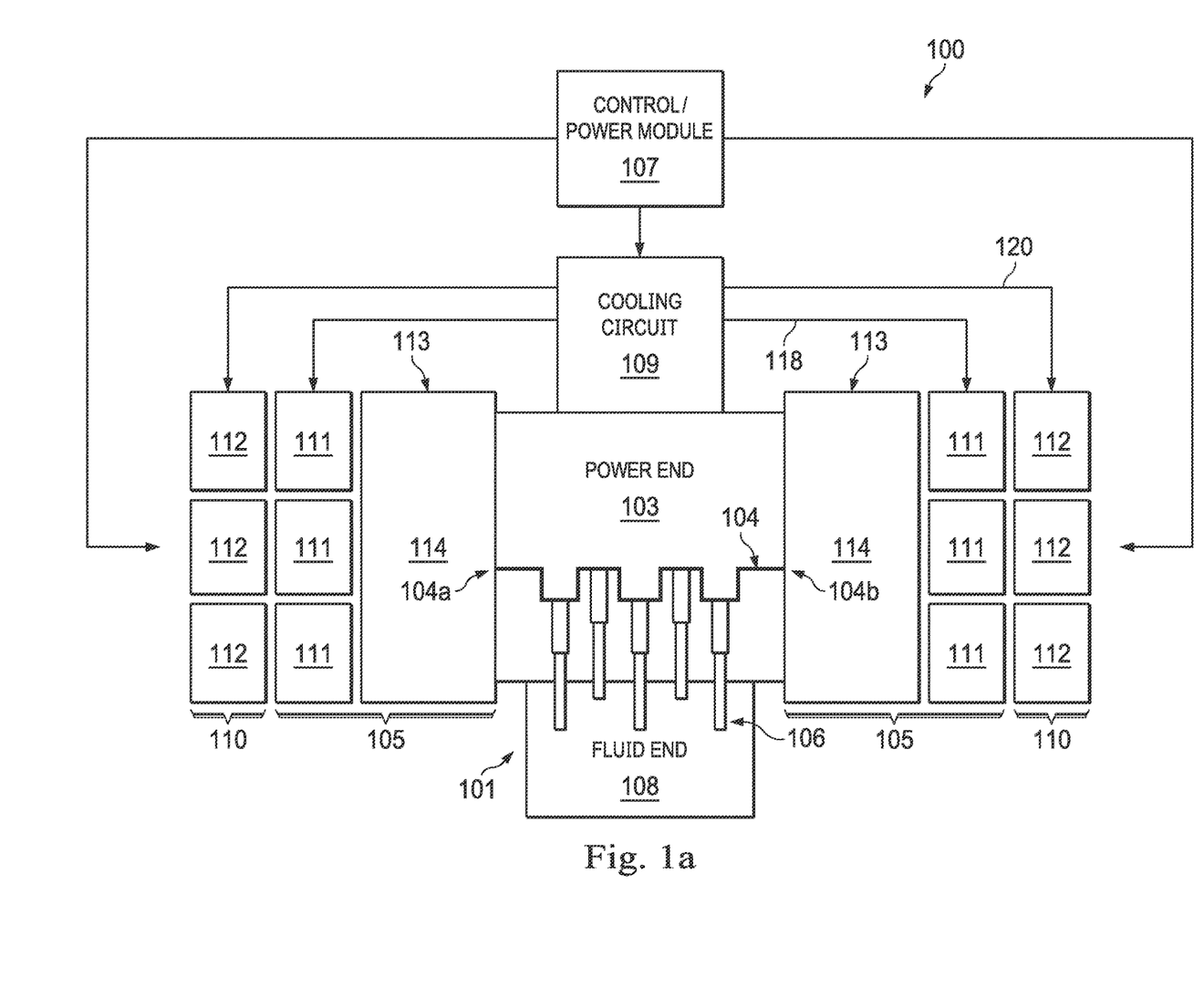
FIG. 1a is a schematic illustration of an electric hydraulic fracturing pump systems according to embodiments of the present disclosure.

Referring to FIG. 1 in the drawings, a schematic of an electric drive hydraulic fracturing pump system 100 for well stimulation through a power end is provided. The electric drive hydraulic fracturing pump system 100 includes a hydraulic fracking pump 101 having a power end 103 and a fluid end 108, a transmission assembly 105, a control module 107, a dual inverter assembly 110 and a temperature regulation circuit 109. Power end 103 is enclosed by a power end housing 103' and is configured to convert, via a crankshaft 104 extending along a pump crankshaft axis, the rotational/rotary motion generated through transmission assembly 105 into a linear motion for operation of plungers 106 within one or more fluid ends 108. Power end 103 may operate with any number of fluid ends 108 of hydraulic fracturing pumps 101 and may be constructed from a casting or fabricated from one or more materials. In one or more embodiments, the crankshaft 104 extends along a crankshaft axis between a first end 104a and a second end 104b with a transmission assembly 105 directly coupled to each end 104a, 104b of crankshaft 104 in order to balance torque applied to crankshaft 104 and maximize power input.

Transmission assembly 105 may be mounted to power end 103 of pump 101. In one or more embodiments, transmission assembly 105 includes at least one electric drive motor 111 electrically coupled to dual inverter assembly 110 having at least one dual inverter 112. In other embodiments, transmission assembly 105 includes at least two, and in some embodiments, a plurality of electric drive motors 111, each having motor housing 111' and a separate drive motor output shaft 115 extending along a motor output axis, and a gearbox assembly 113 in communication with the two or more electric drive motors 111, and in particular, each of the drive motor output shafts 115 of the electric drive motors 111. In embodiments with multiple electric drive motors 111, the motor output axil are parallel with, but spaced radially outward from the pump crankshaft axis so that the electric drive motors 111 can be symmetrically positioned around the pump crankshaft 104. While symmetrical placement is desired in certain embodiments, in other embodiments, however, positioning of electric drive motors 111 around pump crankshaft 104 need not be symmetrical. In one or more embodiments, a transmission assembly 105 is coupled to each end of crankshaft 104 and each transmission assembly 105 includes at least one electric drive motor 111 electrically coupled to its own dual inverter 112. In some embodiments, each transmission assembly 105 includes at least three spaced apart electric drive motors 111, each electrically coupled to its own dual inverter 112. Thus, in some embodiments, three or more electric drive motors 111 may be coupled to each end of the crankshaft 104. In some embodiments, each transmission assembly 105 includes at least five electric drive motors 111 spaced apart about the axis of the crankshaft 104 each of the electric drive motors 111 electrically coupled to its own dual inverter 112. In one or more embodiments, the transmission assembly 105 coupled to each end of the crankshaft 104 has the same number of electric drive motors 111.

Gearbox assembly 113 includes a gearbox housing 113' enclosing a gearset 114 for transferring rotational energy from the two or more electric drive motors 111 of a transmission assembly 105 to the power end 103. Although the disclosure is not intended to be limited to a particular arrangement of gearset 114, in one or more embodiments, gearset 114 includes at least one planetary gearset coupled to crankshaft 104. Such a planetary gearset 114 permits each individual electric drive motor 111 to be spaced apart from the axis of the crankshaft 104. In some embodiments, gearset 114 includes a bull gear attached to crankshaft 104 and a plurality of separate planetary gearsets coupled to the bull gear, where each of the planetary gearsets is coupled to a separate electric drive motor 111. In other words, each electric drive motor 111 drives a separate planetary gearset, and each of the separate planetary gearsets is then coupled to the bull gear. As used herein, the term "coupled" may include both direct attachment as well as meshed with a gear via one or more other gears. In any event, gearbox housing 113' is mounted to power end housing 103' and where gearset 114 is a planetary gearset and thus having a low-profile relative to the radial spacing of electric drive motors 111, housing 113' may likewise be a low-profile housing, thereby minimizing the overall footprint of electric drive hydraulic fracturing pump system 100 at a wellsite.

Although dual inverter assembly 110 need not be, in one or more embodiments, dual inverter assembly 110 is mounted adjacent transmission assembly 105 about the axis of crankshaft 104. In this regard in one or more embodiments, a dual inverter 112 includes an inverter housing 112' and is mounted directly to an electric drive motor 111, and in particular, the motor housing 111' in order to minimize the footprint of electric drive hydraulic fracturing pump system 100 since space at a wellsite is limited. Notably, each dual inverter 112 is mounted externally of an electric drive motor 111 in order to permit independent first and second cooling systems 118, 120 described below to be fluidically coupled to the electric drive motor 111 and dual inverter 112, respectively. In addition, it will be appreciated that in addition to minimizing the footprint at a wellsite, such a mounting arrangement keeps the electrical components of the hydraulic fracturing pump system 100, namely the electric drive motors 111 and the dual inverters 112, spaced above or away from the surface on which the power end 103 is supported, thereby minimizing exposure to fluids and debris that may be typically found at a wellsite about a hydraulic fracturing pump.

In one or more embodiments, dual inverter assembly 110 includes at least two, and in some embodiments, a plurality of dual inverters 112, each dual inverter 112 electrically coupled to a separate electric drive motor 111. In one or more embodiments, a dual inverter assembly 110 is mounted at each end of crankshaft 104 and each dual inverter assembly 110 includes at least two dual inverters. In some embodiments, each dual inverter assembly 110 includes at least three spaced apart dual inverters 112. In some embodiments, each dual inverter assembly 110 includes at least five dual inverters spaced apart about the axis of the crankshaft 104. In one or more embodiments, the dual inverter assembly 110 coupled to each end of the crankshaft 104 has the same number of dual inverters 112.

Electric drive hydraulic fracturing pump system 100 may also include a control module 107 configured to regulate performance of transmission assembly 105 and dual inverter assembly 110. Electrical power is provided by dual inverter assembly 110 to electric drive motors 111, which in turn are used to induce a torque of selected power to rotate gearset 114 within gearbox assembly 113. Control module 107 is used to monitor the performance of each electric drive motor 111 and each dual inverter 112, and control selected functions of each electric drive motor 111, such as power output, speed, on/off, unit temperature, and so forth via each motor's corresponding dual inverter 112. It is understood that these are exemplary in nature and do not form an exhaustive listing of performance characteristics or functions that module 107 may regulate with respect to electric drive motors 111 dual inverters 112 or electric drive hydraulic fracturing pump system 100. Thus, in one or more embodiments, control module 107 may also be utilized to control a temperature regulation circuit 109 having a first cooling system 118 and a second cooling system 120. Through control module 107, electric drive motors 111 and dual inverters 112 can be controlled simultaneously as a group at selected power levels as desired and/or individually wherein each electric drive motor 111 and each corresponding dual inverter 112 is independent of the operation of other electric drive motors 111 and dual inverters 112 with respect to at least torque, power output and runtime. Use of a plurality of electric drive motors 111 and dual inverters 112 allows for simplification of maintenance since one or more electric drive motor 111-dual inverter 112 pairs may be selectively deenergized for maintenance while others electric drive motor 111-dual inverter 112 pairs remain energized for operation of power end 103.

Figure 1B:
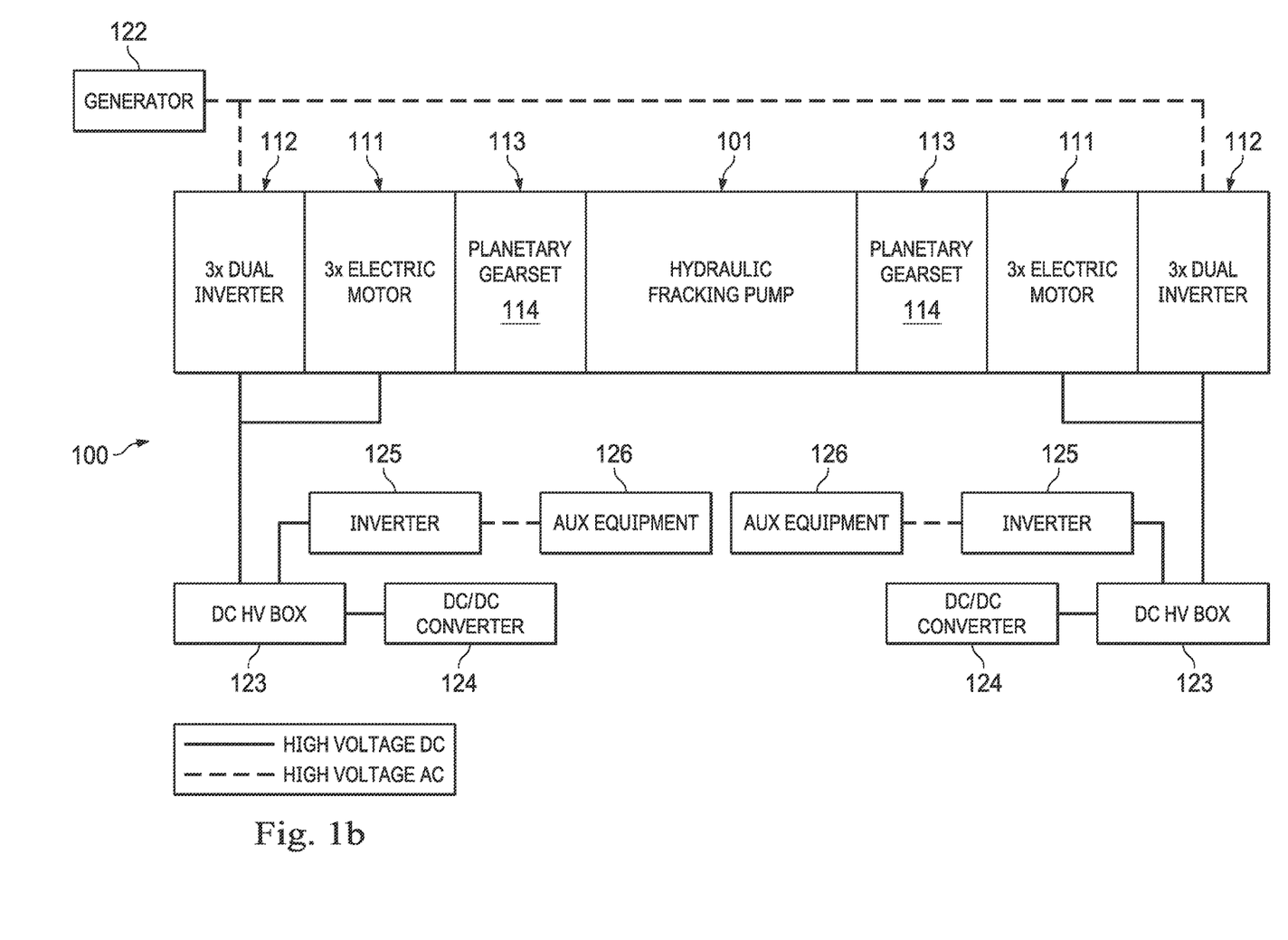

In one or more embodiments, dual inverters 112 may be provided with power from a power source 122, such as the generator shown in FIG. 1B. In other embodiments, power source 122 may be battery stacks or direct feed from a main power grid.

As seen in FIGS. 1a and 1b, either one or two transmission assemblies 105 may be coupled to drive power end 103. Electric drive motors 111 of transmission assemblies 105 can be configured to operate in a clock-wise (CW) direction or a counter clock-wise (CCW) direction so as to collectively rotate in the same direction relative to power end 103. Moreover, unlike hydraulic fracturing pumps of the prior art driven by internal combustion engines that can only drive a pump crankshaft in a single CW or CCW direction, the dual inverters 112 as described herein can be utilized to reverse directions of the electric drive motors 111. This is desirable because it can alter the wear surface within pump 101, extending the life of the pump before the need for maintenance. Thus, in some embodiments, of the invention, the electric drive motors 111 can be operated to drive the crankshaft 104 for a certain period of time in a first rotational direction and then reversed to drive the crankshaft 104 for a period of time in a second rotational direction opposite the first rotational direction, enabling wear to be evenly distributed on a pump component. For example, the electric drive motors 111 may alternatively be utilized to rotate a crankshaft 104 of a hydraulic fracking pump 101 in a CW direction for a discrete period of time, such as 48 hours, and then, the dual inverters 112 may be operated to reverse direction of the electric drive motors 111 and rotate a crankshaft 104 of a hydraulic fracking pump 101 in a CCW direction for a discrete period of time, such as 48 hours. This may continue in an alternating fashion in order to ensure even wear on components of hydraulic fracking pump 101.

Although electric drive motors 111 may be arranged in any manner within transmission assembly 105, in one or more embodiments, electric drive motors 111 may be symmetrically spaced about the axis of crankshaft 104. One or more electric drive motor 111 may be in direct communication with the gearset 114 of gearbox assembly 113, which is directly coupled to crankshaft 104.

Temperature regulation circuit 109 is configured to regulate the temperature levels of various components of electric drive hydraulic fracturing pump system 100, particularly the electric drive motors 111 and the dual inverters 112. In one or more embodiments, temperature regulation circuit 109 is a cooling circuit having a first cooling system 118 disposed to cool electric drive motors 111 and a second cooling system 120 disposed to cool dual inverters 112. First cooling system 118 circulates a first coolant fluid while second cooling system 120 circulates a second coolant fluid. In one or more embodiments first coolant fluid is an oil based coolant and second coolant is a water-based coolant, such as a water-glycol fluid. The oil-based coolant may be synthetic oil or conventional oil.

Figure 2:
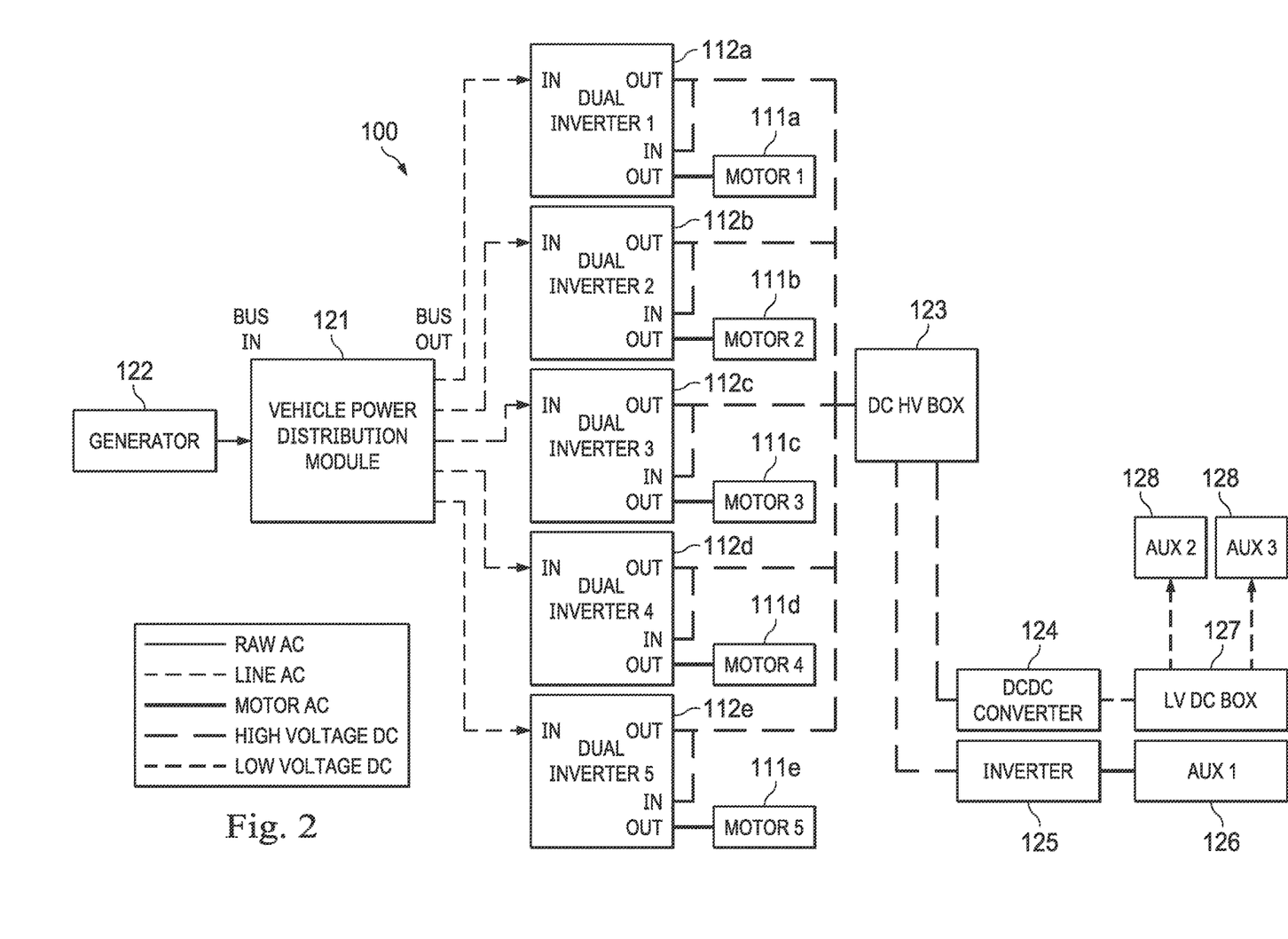
FIG. 2 is a schematic illustration of the electrical architecture of an electric hydraulic fracturing pump system.

With reference to FIG. 2, each dual inverter 112 may include an AC terminal for receiving an alternating current (AC) power signal from a power distribution module 121 electrically coupled to power source 122. In FIG. 2, five electric drive motors 111a-111e are illustrated, along with corresponding dual inverters 112a-112e. In this regard, the power distribution module 121 may be disposed to receive an AC power signal from power source 122. In any event, each dual inverter 112a-112e includes a high voltage direct current (DC) terminal for transmitting the converted AC power signal. A first line out from the high voltage DC terminal may be electrically coupled to one or more converters 124 to convert the high voltage DC power signal to a low voltage DC power signal for driving one or more auxiliary electrical components 128, such as fans or pumps. In one or more embodiments, the low voltage DC power signal from converter 124 may be directed through a low voltage DC splitter 127 to a plurality of auxiliary components 128. The first line out from the high voltage DC terminal may be electrically coupled to one or more inverters 125 to convert the high voltage DC power signal to an AC power signal for driving one or more auxiliary electrical components 126, such an oil motor. With reference to FIGS. 1B and 2, the first line out from the high voltage DC terminal may be directed through a high voltage DC splitter 123 to a plurality of inverters 125, a plurality of converters 124, or to at least one inverter 125 and at least one converter 124. In some embodiments, at least one high voltage DC splitter 123 may be supplied on each end of the crankshaft 104. In one or more embodiments, the high voltage DC splitter 123 may further include one or more inductor, capacitor, transformer, switch, DC filter, and/or regulator. A second line out from the high voltage DC terminal may be pulse width modulated by the dual inverter 112 to produce a modulated AC power signal for a corresponding electric drive motor 111. In one or more alternative embodiments, a DC power signal may be supplied to dual inverter 112 and utilized to drive a electric drive motor 111, which may be the same electric drive motor 111 driven by the AC power signal from power source 122 or may be a different electric drive motor 111. Likewise, a second power source 122' (not shown) may provide and electrically coupled to a dual inverter 112, whereby the first power source 122 provides an AC power signal and the second power source 112' provides a DC power signal, and the different power sources 112, 112' may be utilized as demand and availability of a particular type of power signal dictate.

Figure 3:
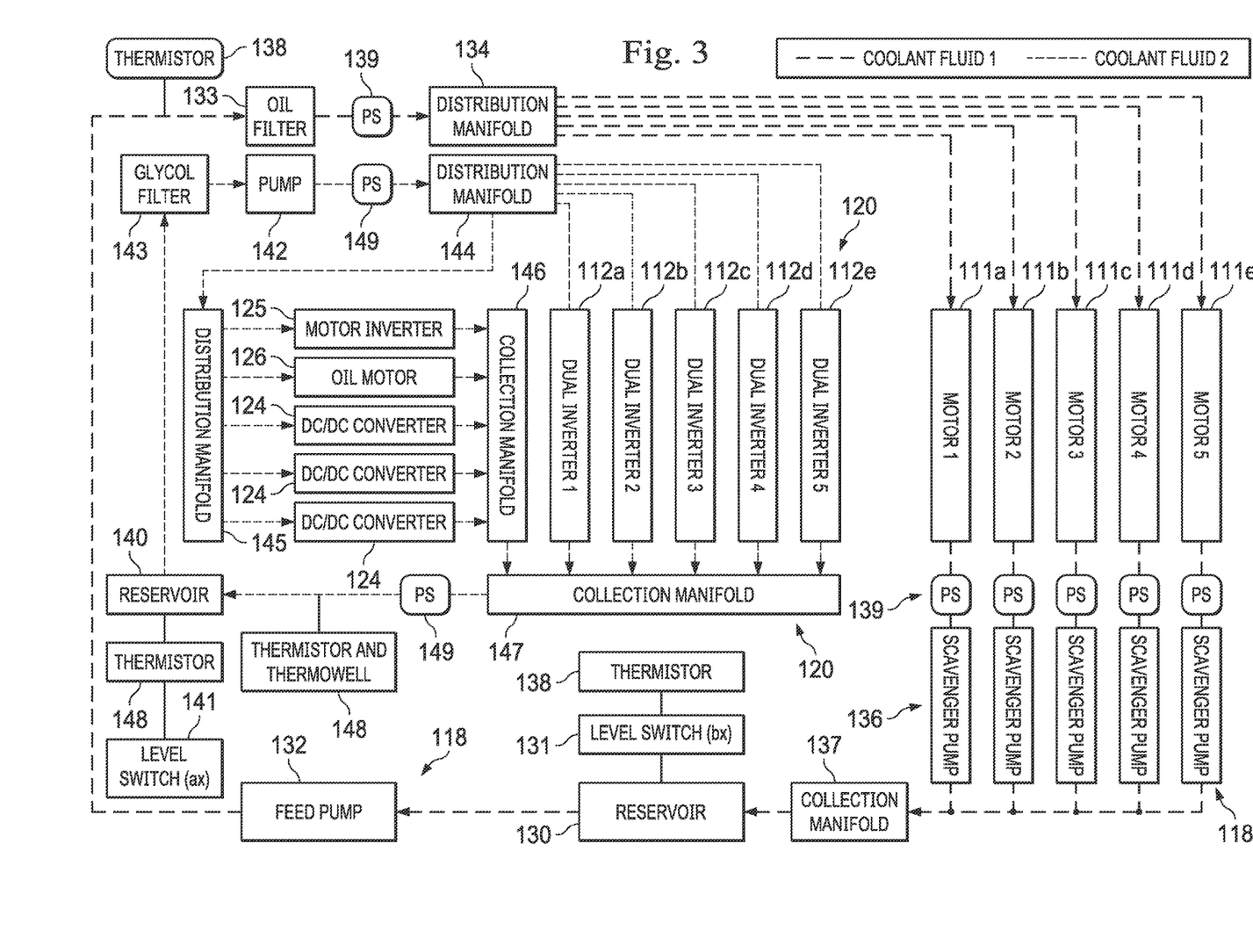
FIG. 3 is a schematic illustration of the cooling circuit architecture of an electric hydraulic fracturing pump system of Fla 2.

With reference to FIG. 3, a first cooling system 118 is disposed to cool electric drive motors 111. In FIG. 3, five electric drive motors 111a-111e are illustrated. Each electric drive motor 111 may include an associated scavenger pump 136, such as referenced above as auxiliary equipment, to pump the first coolant from its electric drive motor 111 into a collection manifold 137 that is in fluid communication with a first coolant reservoir 130. In one or more embodiments, the first coolant reservoir 130 includes a level switch system 131 for monitoring and/or controlling the levels of the first coolant in the first coolant reservoir 130. In some embodiments, the first coolant is oil-based coolant that can be utilized both for cooling the electric drive motor 111 as well as lubricating components of the electric drive motor 111. For this reason, the first coolant of this embodiment is non-water based since water could damage operation of the electric drive motors 111. A feed pump 132 may be utilized to draw the first coolant from the first coolant reservoir 130 and pump the first coolant to a first heat exchanger 133. The first heat exchanger 133 is an oil heat exchanger. In one or more embodiments, first heat exchanger 133 is fan cooled. Moreover, in one or more embodiments, the first heat exchanger 130 is a variable speed, fan cooled heat exchanger having one or a set of variable speed fans for cooling the first coolant, a set comprising two or more variable speed fans. The speed of the cooling fans may be varied based on the heat output of the electric drive motors 111. A distribution manifold 134 may be employed to direct the first coolant from the first heat exchanger 133 to a plurality of electric drive motors 111. The first cooling system 118 may include one or more sensors. The sensors may include, but are not limited to, a temperature sensor 138, such as a thermistor, and a pressure sensor 139.

The second cooling system 120 may be utilized to cool dual inverters 112. In FIG. 3, five dual inverters 112a-112e are illustrated. The second coolant is pumped from a second coolant reservoir 143 by a second coolant pump 142 and supplied to a distribution manifold 144 that supplies the second coolant to each of the dual inverters 112a-112e. In addition, the distribution manifold 144 may supply the second coolant through an auxiliary distribution manifold 145 to one or more converters 124, inverters 125, and/or auxiliary components 126, as illustrated. A collection manifold 147 may be employed to collect the second coolant from the dual inverters 112a-112e and deliver the second coolant to a second heat exchanger 140. In one or more embodiments, the second coolant may also collect the second coolant from the auxiliary equipment through an auxiliary collection manifold 146. In one or more embodiments, the second heat exchanger 140 includes a level switch system 141 for monitoring and/or controlling the levels of the second coolant in the second heat exchanger 140. In some embodiments, the second coolant is a water-based coolant, such as water-glycol fluid. It will be understood that use of dual inverters 112 as described herein generate a relatively large amount of heat during the process of rectifying and then pulse width modulating the power signal as described above. As such, it is desirable to utilize a water-based coolant having a high specific heat, particularly, in some embodiments, a specific heat that is higher than the specific heat of the first coolant. In one or more embodiments, second heat exchanger 140 is fan cooled. Moreover, in one or more embodiments, second heat exchanger 140 is a variable speed, fan cooled heat exchanger having one or a set of variable speed fans for cooling the second coolant. The speed of the cooling fans may be varied based on the heat output of the dual inverters 112. Although the auxiliary distribution and collection manifolds 145, 146 are illustrated as part of the second cooling system 120, in one or more embodiments, these components may be included only in the first cooling system 118 and, in other embodiments, each of the first and second cooling systems 118, 120 includes these components. As with the first cooling system 118 above, the second cooling system 120 may include one or more sensors. The sensors may include, but are not limited to, a temperature sensor 148, such as a thermistor, and a pressure sensor 149. It will be appreciated that the pulse width modulation performed by the dual inverters 112 generates a particularly large amount of heat, and that the second cooling system 120 is desirable to maintain the temperature of dual inverters 112a-112e at preferred operating temperatures. In this regard, in one or more embodiments, it is desirable to have separate heat exchangers 130, 140 with separate sets of fans for cooling the separate first and second coolants since the heat dissipation requirements for the first and second coolants may differ. Thus, in one or more embodiments, the first and second cooling systems 118, 120 may be independent of one another and the heat exchangers 130, 140 with their corresponding sets of variable fans may be operated independent of one another.

Figure 4:
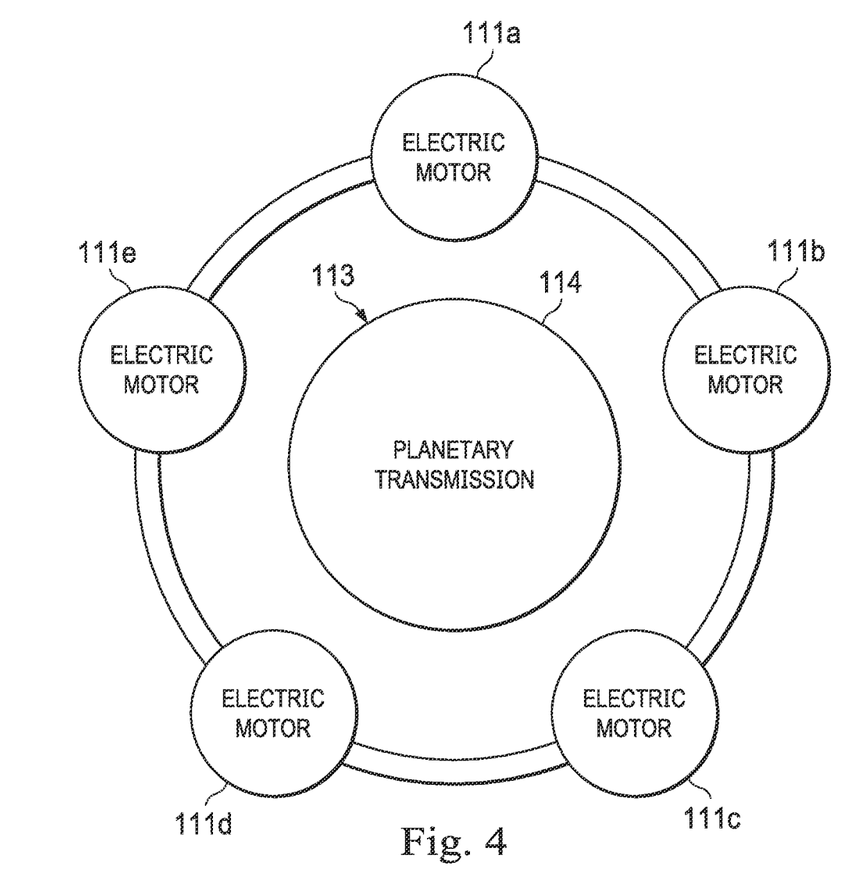
FIG. 4 is a is a schematic illustration of one embodiment of a power transmission system of the electric hydraulic fracturing pump system.

Referring to FIG. 4, a plurality of electric drive motors 111a-111e may be spaced around a central gearbox assembly 113 including a gearset 114. Although five electric drive motors 111a-111e are illustrated, the number of electric drive motors 111 is not so limited. Electric drive motors 111a-111e may be evenly spaced about the gearset 114, as shown in FIG. 4.

Figure 5A:
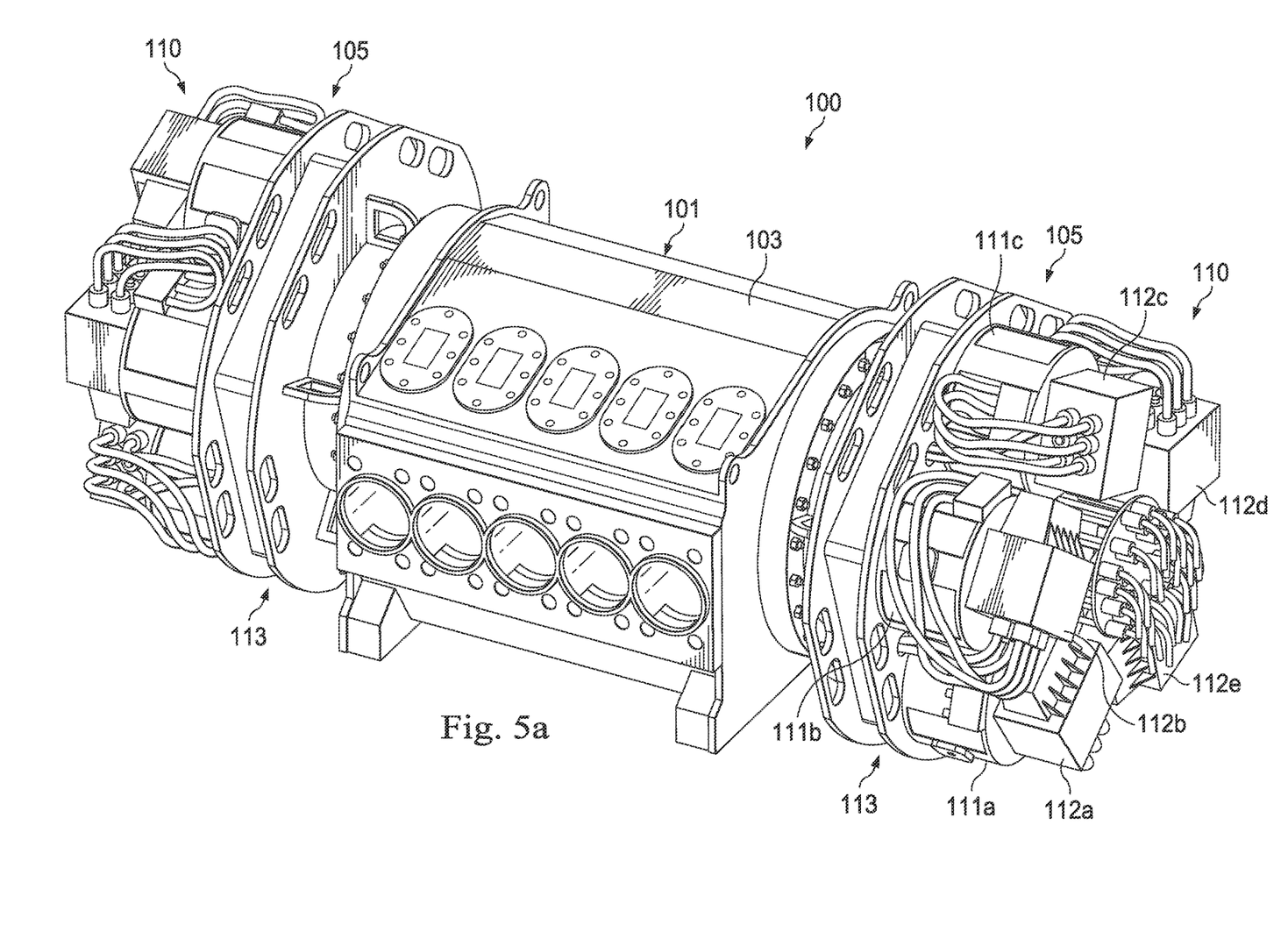
FIG. 5a is front perspective view of an electric hydraulic fracturing pump system according to embodiments of the present disclosure.
Figure 5B:
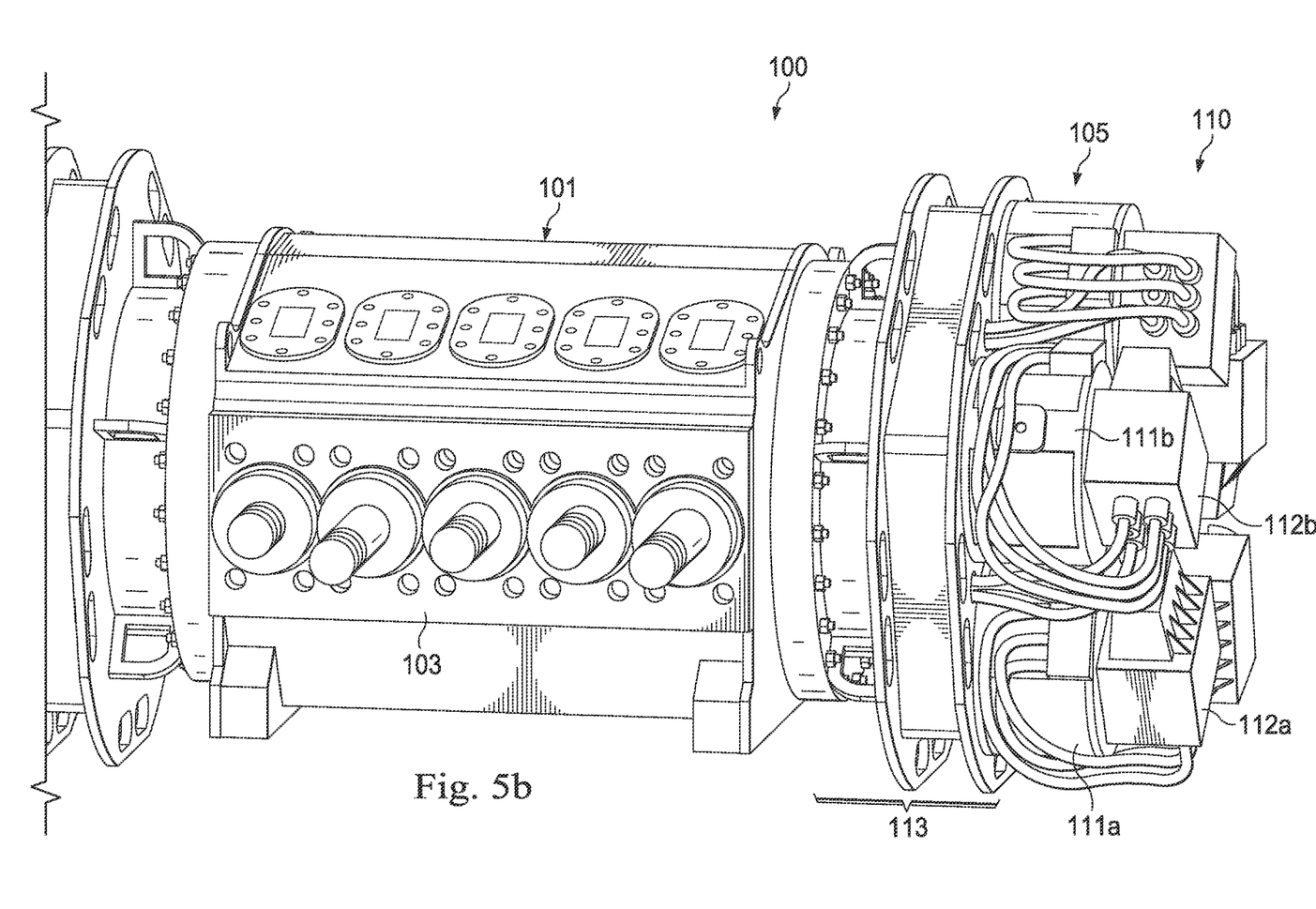

FIGS. 5a, 5b, 6a, 6b, and 6c provide various views of an electric drive hydraulic fracturing pump system 100 according to the present description. In FIGS. 5a and 5b, electric drive hydraulic fracturing pump system 100 is shown having a power end 103 with a power end housing 103' enclosing the power end 103, including the crankshaft 104 (see FIG. 1). A transmission assembly 105 is disposed on opposing sides of power end 103 of the hydraulic fracking pump 101. In particular, a gearbox assembly 113 is mounted on power end housing 103' at opposing ends of power end 103, with a plurality of electric drive motors 112 mounted on each of the opposing gearbox assemblies 113 and spaced radially outward from the crankshaft 104. Each electric drive motor 111 has a dual inverter 112 externally mounted on the electric drive motor 111, and in particular, each dual inverter housing 112' is mounted on a motor housing 111' of an electric drive motor 111 so that the electric drive motor 111 externally supports a dual inverter 112. In one or more embodiments, the dual inverter 112 externally supported by an electric drive motor 111 is the dual inverter 112 electrically coupled to that electric drive motor 111.

Figure 6A:
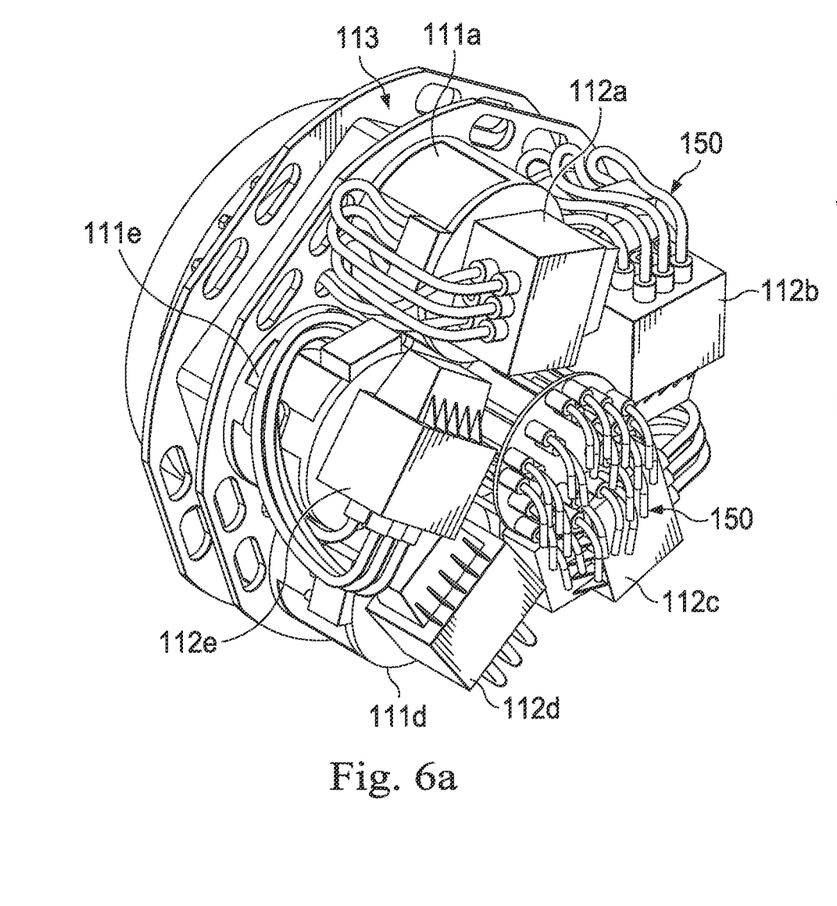
FIG. 6a is a perspective view of the electric; motor and dual inverter arrangement of embodiments of an electric hydraulic fracturing pump system.
Figure 6B:
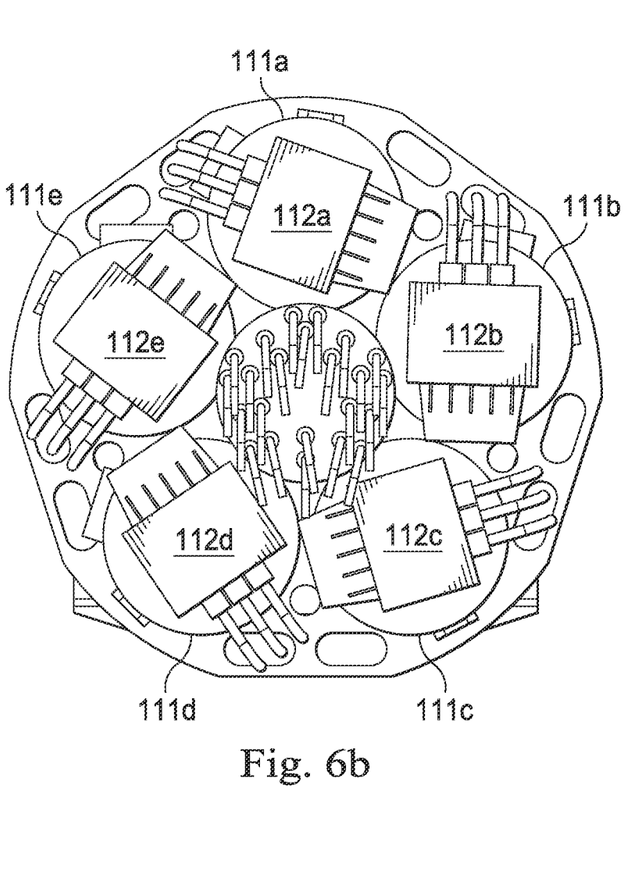
FIG. 6b is an end view of the electric hydraulic fracturing pump system of FIG.
Figure 6C:
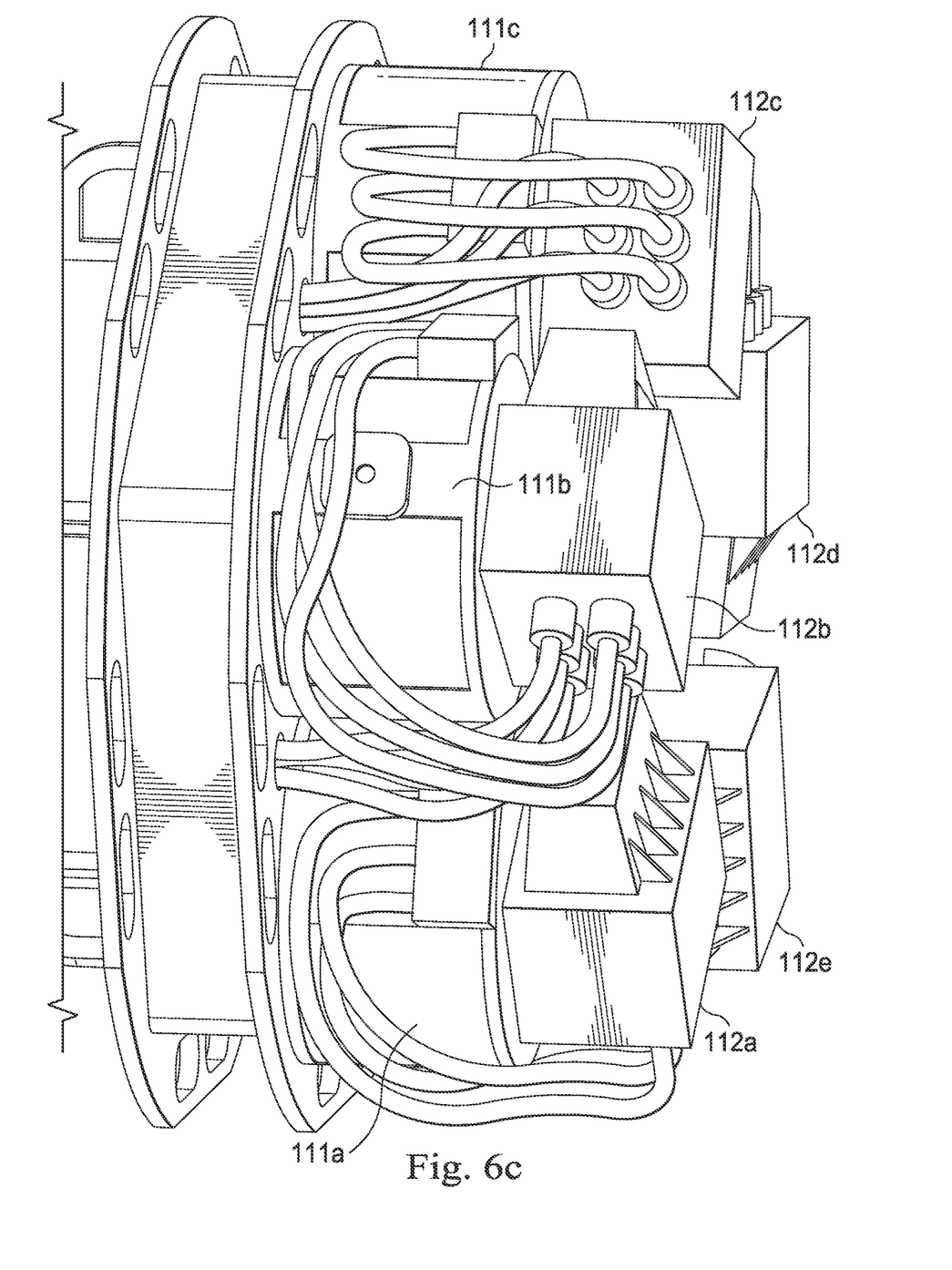

In other embodiments, a single transmission assembly 105 may be employed. As shown, each transmission assembly 105 may be coupled to a dual inverter assembly 110. Referring to FIG. 6a, a plurality of communication lines 150 may be used to interconnect the various components of the electric drive hydraulic fracturing pump system 100, as described herein. The communication lines 150 may include electrical cables for carrying an electrical signal and/or hydraulic lines for carrying coolant through the first or second cooling systems 118, 120.

Thus, a hydraulic fracturing pump system has been described. The hydraulic fracturing pump system includes a hydraulic fracturing pump having a pump crankshaft; an electric drive motor coupled to the pump crankshaft; and an electric dual inverter electrically coupled to the electric drive motor. In other embodiments, the hydraulic fracturing pump system may include a hydraulic fracturing pump having a pump crankshaft; a planetary gearset having an input shaft and an output shaft, the output shaft coupled to the pump crankshaft; an electric drive motor coupled to the input shaft of the planetary gearset; and an electric dual inverter electrically coupled to the electric drive motor. In yet other embodiments, a hydraulic fracturing pump system may include a hydraulic fracturing pump having a pump crankshaft extending along a pump crankshaft axis; at least three electric drive motors coupled to the power input shaft, each drive motor having an motor output axis along which a drive motor output shaft extends, each of the three drive motors positioned about the pump crankshaft axis so that each drive motor output shaft is spaced apart from the from the pump crankshaft axis; and at least three electric dual inverters, each dual inverter electrically coupled to an electric drive motor. Still yet other hydraulic fracturing pump systems may include a hydraulic fracturing pump having a pump crankshaft extending along a pump crankshaft axis; at least three electric drive motors coupled to the pump crankshaft, each drive motor having an motor output axis along which a drive motor output shaft extends, each of the three drive motors positioned about the pump crankshaft axis so that each drive motor output shaft is spaced apart from the from the pump crankshaft axis and from each other; and at least three electric dual inverters, each dual inverter electrically coupled to a separate electric drive motor. A hydraulic fracturing pump system comprising a power end and a fluid end, wherein the power end includes a power end housing disposed around a crankshaft; a gearbox assembly comprising a gearset coupled to the crankshaft and enclosed by a gearbox housing mounted on the power end housing; a plurality of electric drive motors, each electric drive motor spaced radially outward from the crankshaft and having a drive motor output shaft coupled to the gearset and a motor housing mounted on the gearbox housing; and a plurality of dual inverters, each dual inverter electrically coupled to a separate electric drive motor and having an inverter housing coupled externally to a motor housing.

For any of the foregoing embodiments, the hydraulic fracturing pump system may include any one of the following elements, alone or in combination with any other elements:

At least five electric drive motors coupled to the pump crankshaft, each drive motor having an motor output axis along which a drive motor output shaft extends, each of the five drive motors positioned about the pump crankshaft axis so that each drive motor output shaft is spaced apart from the from the pump crankshaft axis; and at least five electric dual inverters, each dual inverter electrically coupled to an electric drive motor.

At least five electric drive motors coupled to the pump crankshaft, each drive motor having an motor output axis along which a drive motor output shaft extends, each of the five drive motors symmetrically positioned about the pump crankshaft axis so that each drive motor output shaft is spaced apart from the from the pump crankshaft axis and from each other; and at least five electric dual inverters, each dual inverter electrically coupled to a separate electric drive motor.

Each drive motor is symmetrically spaced about the pump crankshaft axis.

The hydraulic pump further comprises a pump crankcase from which the pump crankshaft extends, the hydraulic fracturing pump system further comprising a drive motor support housing attached to the pump crankcase.

The drive motor support housing is a gearbox.

A planetary gearset having an input shaft and an output shaft, the output shaft coupled to the pump crankshaft of the hydraulic fracturing pump and the input shaft coupled to a drive motor output shaft.

At least three planetary gearsets, each gearset having an input shaft and an output shaft, the output shaft coupled to the pump crankshaft of the hydraulic fracturing pump and each gearset input shaft coupled to a drive motor output shaft.

A separate planetary gearset engaging each drive motor, each gearset having an input shaft and an output shaft, the output shaft coupled to the pump crankshaft of the hydraulic fracturing pump and each gearset input shaft coupled to a drive motor output shaft.

The hydraulic fracturing pump further comprises a pump crankcase having a first end and a second end with a with a crankshaft extending between the two crankcase ends along a crankshaft axis, the crankshaft having a first end and a second end.

A separate electric drive motor coupled to each end of the pump crankshaft; and a separate electric dual inverter electrically coupled to each electric drive motor.

At least three planetary gearsets disposed at each end of the crankcase, each gearset having an input shaft and an output shaft, the output shaft coupled to the pump crankshaft end adjacent the planetary gearset, each gearset input shaft coupled to a drive motor output shaft.

At least three electric drive motors coupled to the pump crankshaft at each end of the crankcase, each drive motor having an motor output axis along which a drive motor output shaft extends, each of the three drive motors at each crankcase end symmetrically positioned about the pump crankshaft axis so that each drive motor output shaft is spaced apart from the from the pump crankshaft axis and from each other; and at least three electric dual inverters at each end of the crankcase, each dual inverter electrically coupled to a separate electric drive motor.

Each drive motor comprises a drive motor housing, and each drive motor housing has a dual inverter mounted thereon.

Each drive motor housing is substantially circular.

Each drive motor housing is substantially disk shaped.

Each dual inverter has a first alternating current input, a first high voltage output, a first high voltage input and an alternating current output.

A power source electrically coupled to the first alternating current input of the dual inverter.

The alternating current output of the dual inverter is electrically coupled to the electrical input of a drive motor.

The power source is a turbine electric generator.

An electric converter and a low voltage auxiliary electric device electrically coupled to the electric converter, wherein the high voltage output of the dual inverter is coupled to the electric converter.

The low voltage auxiliary electric device is a pump.

The low voltage auxiliary electric device is a cooling fan.

An electric inverter and a low voltage auxiliary device oil motor electrically coupled to the electric inverter, wherein the high voltage output of the dual inverter is coupled to the electric inverter.

A first cooling system having a first cooling fluid and a second cooling system having a second cooling fluid.

The first cooling system is fluidically coupled to a drive motor and the second cooling system is fluidically coupled to a dual inverter.

The first cooling fluid is oil-based and the second cooling fluid is water-based.

The first cooling system comprises a first heat exchanger and the second cooling system comprises a second heat exchanger.

The first cooling system is independent of the second cooling system.

The first heat exchanger is independent of the second heat exchanger.

The first heat exchanger comprises a variable speed fan and the second heat exchanger comprises a variable speed fan.

The first heat exchanger comprises a set of variable speed fans and the second heat exchanger comprises a set of variable speed fans.

The first cooling system is fluidically coupled to each drive motor and the second cooling system is fluidically coupled to each dual inverter.

The motor has a cooling fluid inlet and a cooling fluid outlet.

The dual inverter has a cooling fluid inlet and a cooling fluid outlet.

A dual inverter mounted externally on an electric drive motor.

Each dual inverter mounted externally on an electric drive motor.

Each dual inverter mounted externally on the electric drive motor to which the dual inverter is electrically coupled.

The A gearbox housing mounted to the

A first fluid reservoir and a first fluid pump fluidically coupled thereto, wherein the cooling fluid inlet of the motor is fluidically coupled to the first fluid pump and the cooling fluid outlet of the motor is fluidically coupled to the first fluid reservoir.

A scavenger pump fluidically coupled between the cooling fluid outlet of the motor and the first fluid reservoir.

A second fluid reservoir and a second fluid pump fluidically coupled thereto, wherein the cooling fluid inlet of the dual inverter is fluidically coupled to the second fluid pump and the cooling fluid outlet of the dual inverter is fluidically coupled to the second fluid reservoir.

The electric inverter is fluidically coupled to the second reservoir.

The low voltage auxiliary device oil motor is fluidically coupled to the second reservoir.

Thus, a method for operating a hydraulic fracturing pump has been described. In one or more embodiments, the method generally incudes utilizing a first dual inverter to supply electrical current to a first electric motor; energizing a first electric motor to initiate rotation of hydraulic fracturing pump crankshaft; and thereafter utilizing a second dual inverter to supply electrical current to a second electric motor; and energizing the second electric motor to provide power to the pump crankshaft. In other embodiments, the method includes energizing a first electric motor to initiate rotation of hydraulic fracturing pump crankshaft; and utilizing a dual inverter to dynamically control the electric motor to adjust power to the pump crankshaft. In other embodiments, the method includes energizing a plurality of electric motors to rotate a hydraulic fracturing pump crankshaft; and utilizing a plurality of dual inverters to separately control the electric motors to adjust power to the pump crankshaft. In other embodiments, the method may include utilizing a first dual inverter to energize a first electric motor to initiate rotation of hydraulic fracturing pump crankshaft; and thereafter utilizing a second dual inverter and a third dual inverter to energizing at least a second electric motor and a third electric motor, respectively, to provide power to the pump crankshaft.

For the foregoing embodiments, the method may include any one of the following steps, alone or in combination with each other:

Measuring a condition of the hydraulic fracturing pump and based on the measured condition, energizing at least a second electric motor and a third electric motor to provide power to the pump crankshaft.

Measuring a condition of the hydraulic fracturing pump and based on the measured condition, energizing at least a fourth electric motor and a fifth electric motor to provide power to the pump crankshaft.

Measuring a condition of the hydraulic fracturing pump and based on the measured condition, dynamically controlling a plurality of electric motors to adjust power to the pump crankshaft.

Dynamically controlling a plurality of electric motors to adjust power to the pump crankshaft.

Separately controlling a plurality of electric motors to adjust power to the pump crankshaft.

Rectifying an input alternating current from a power source to a high voltage direct current; and thereafter, reducing the average power delivered by high voltage direct current through pulse width modulation to generate a pulse width modulation signal; and energizing the first electric motor utilizing the pulse width modulation signal.

Utilizing a power source to provide an alternating current to a hydraulic fracturing pump system; rectifying the alternating current to a high voltage direct current; and thereafter, reducing the average power delivered by high voltage direct current through pulse width modulation to generate a pulse width modulation signal; and energizing the first electric motor utilizing the pulse width modulation signal.

Utilizing a power source to provide an alternating current to a hydraulic fracturing pump system having a plurality of electric motors; separately for each electric motor, (i) rectifying the alternating current to a high voltage direct current; (ii) reducing the average power delivered by high voltage direct current through pulse width modulation to generate a pulse width modulation signal; and (iii) energizing the electric motor utilizing the pulse width modulation signal.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A hydraulic fracturing pump system comprising:
   a hydraulic fracturing pump having a pump crankshaft extending along a crankshaft axis and a pump crankcase with a first crankcase end and a second crankcase end, with the pump crankshaft extending between the first and second crankcase ends;
   a plurality of electric drive motors, each electric drive motor having a motor housing and a separate drive motor output shaft coupled to the pump crankshaft, each electric drive motor of the plurality of electric drive motors having a first cooling fluid inlet and a first cooling fluid outlet;
   a plurality of electric dual inverters, the plurality of electric dual inverters including a number of electric dual inverters corresponding to a number of electric drive motors in the plurality of electric drive motors, each electric dual inverter coupled to a separate one of the plurality of electric drive motors, each electric dual inverter of the plurality of electric dual inverters having a second cooling fluid inlet and a second cooling fluid outlet;
   a first cooling system having
      a first cooling fluid,
      a first fluid reservoir and
      a first fluid pump,
      all in fluid communication with the first cooling fluid inlet of each of the plurality of the electric drive motors; and
   a second cooling system having
      a second cooling fluid,
      a second fluid reservoir and
      a second fluid pump,
      all in fluid communication with the second cooling fluid inlet of each of the plurality of electric dual inverters.

2. The hydraulic fracturing pump system of claim 1, wherein the first cooling system further comprises a first distribution manifold, wherein the first distribution manifold is in parallel fluid communication with the first cooling fluid inlet of each of the plurality of electric drive motors.

3. The hydraulic fracturing pump system of claim 2, wherein the second cooling system further comprises a second distribution manifold, wherein the second distribution manifold is in parallel fluid communication with the second cooling fluid inlet of each of the plurality of electric dual inverters.

4. The hydraulic fracturing pump system of claim 3, wherein the first cooling system further comprises a first collection manifold configured to combine parallel outflow of the first cooling fluid from each of the respective first cooling fluid outlets to produce a first combined flowstream before the first cooling fluid enters a first heat exchanger located upstream of the first distribution manifold.

5. The hydraulic fracturing pump system of claim 4, wherein the second cooling system further comprises a second collection manifold configured to combine parallel outflow of the second cooling fluid from each of the respective second cooling fluid outlets to produce a second combined flowstream before the second cooling fluid enters a second heat exchanger located upstream of the second distribution manifold.

6. The hydraulic fracturing pump system of claim 1, wherein the first cooling fluid has a first specific heat, and the second cooling fluid has a second specific heat that is higher than the first specific heat.

7. The hydraulic fracturing pump system of claim 6, wherein the first cooling fluid is oil-based and the second cooling fluid is water-based.

8. The hydraulic fracturing pump system of claim 1, wherein each electric motor of the plurality of electric motors is deployed and spaced apart from one another radially about the crankshaft axis, each electric motor of the plurality of electric motors coupled via the separate drive motor output shaft to a central bull gear that, in turn, is coupled to a plurality of planetary gearsets to achieve a gear reduction for transfer of power to the pump crankshaft.

9. The hydraulic fracturing pump system of claim 8 in which each of the electric dual inverters are configured to rectify an AC power signal from a power source into a DC power signal and thereafter, apply pulse width modulation to the DC power signal to produce an AC output voltage and frequency in order to control torque of a corresponding one of the electric drive motors.

10. A hydraulic fracturing pump system comprising:
    a hydraulic fracturing pump having a pump crankshaft extending along a crankshaft axis and a pump crankcase with a first crankcase end and a second crankcase end, with the pump crankshaft extending between the first and second crankcase ends;
    a plurality of electric drive motors, each electric drive motor having a motor housing and a separate drive motor output shaft coupled to the pump crankshaft, each electric drive motor of the plurality of electric drive motors having a first cooling fluid inlet and a first cooling fluid outlet;
a plurality of electric inverters, the plurality of electric inverters including a number of electric inverters corresponding to a number of electric drive motors in the plurality of electric drive motors, each electric inverter coupled to a separate one of the plurality of electric drive motors, each electric inverter of the plurality of electric inverters having a second cooling fluid inlet and a second cooling fluid outlet;
a first cooling system having
a first cooling fluid,
a first fluid reservoir and
a first fluid pump,
all in fluid communication with a plurality of parallel first flow paths, each parallel first flowpath in fluid communication with a different one of the first cooling inlets of the plurality of electric drive motors; and
a second cooling system having
a second cooling fluid,
a second fluid reservoir and
a second fluid pump,
all in fluid communication with a plurality of parallel second flow paths, each parallel second flowpath in fluid communication with a different one of the second cooling inlets of the plurality of electric inverters.

11. The hydraulic fracturing pump system of claim 10, wherein the first cooling system further comprises a first distribution manifold, wherein the first distribution manifold is in parallel fluid communication with the first cooling fluid inlet of each of the plurality of electric drive motors.

12. The hydraulic fracturing pump system of claim 11, wherein the second cooling system further comprises a second distribution manifold, wherein the second distribution manifold is in parallel fluid communication with the second cooling fluid inlet of each of the plurality of electric inverters.

13. The hydraulic fracturing pump system of claim 12, wherein the first cooling system further comprises a first collection manifold configured to combine parallel outflow of the first cooling fluid from each of the respective first cooling fluid outlets to produce a first combined flowstream before the first cooling fluid enters a first heat exchanger located upstream of the first distribution manifold.

14. The hydraulic fracturing pump system of claim 13, wherein the second cooling system further comprises a second collection manifold configured to combine parallel outflow of the second cooling fluid from each of the respective second cooling fluid outlets to produce a second combined flowstream before the second cooling fluid enters a second heat exchanger located upstream of the second distribution manifold.

15. The hydraulic fracturing pump system of claim 10, wherein the first cooling fluid has a first specific heat, and the second cooling fluid has a second specific heat that is higher than the first specific heat.

16. The hydraulic fracturing pump system of claim 15, wherein the first cooling fluid is oil-based and the second cooling fluid is water-based.

17. The hydraulic fracturing pump system of claim 10, wherein each electric motor of the plurality of electric motors is deployed and spaced apart from one another radially about the crankshaft axis, each electric motor of the plurality of electric motors coupled via a separate drive motor output shaft to a central bull gear that, in turn, is coupled to a plurality of planetary gearsets to achieve a gear reduction for transfer of power to the pump crankshaft.

18. The hydraulic fracturing pump system of claim 17 in which each of the electric inverters are configured to rectify an AC power signal from a power source into a DC power signal and thereafter, apply pulse width modulation to the DC power signal to produce an AC output voltage and frequency in order to control flow and torque of a corresponding one of the electric drive motors.

* * * * *